United States Patent
Wurzbacher et al.

(10) Patent No.: US 12,542,122 B2
(45) Date of Patent: Feb. 3, 2026

(54) METHOD FOR REDUCING ECHO IN A HEARING INSTRUMENT AND HEARING INSTRUMENT

(71) Applicant: Sivantos Pte. Ltd., Singapore (SG)

(72) Inventors: Tobias Wurzbacher, Erlangen (DE); Henning Puder, Erlangen (DE)

(73) Assignee: Sivantos Pte. Ltd., Singapore (SG)

( * ) Notice: Subject to any disclaimer, the term of this patent is extended or adjusted under 35 U.S.C. 154(b) by 338 days.

(21) Appl. No.: 18/173,946

(22) Filed: Feb. 24, 2023

(65) Prior Publication Data

US 2023/0267910 A1    Aug. 24, 2023

(30) Foreign Application Priority Data

Feb. 24, 2022   (DE) ...................... 10 2022 201 942.3

(51) Int. Cl.
   *G10K 11/178* (2006.01)
(52) U.S. Cl.
   CPC .. *G10K 11/17825* (2018.01); *G10K 11/17823* (2018.01); *G10K 11/17881* (2018.01);
   (Continued)
(58) Field of Classification Search
   CPC ....... G10K 11/17825; G10K 11/17823; G10K 11/17881; G10K 2210/1081; G10K 2210/3026; G10K 2210/3027; G10K 2210/3028; G10K 2210/3056; G10K 2210/505; G10K 11/17879; G10K 11/17885; G10K 2210/301; G10K 2210/3014; G10K 2210/30281; G10K 2210/3055; G10K 2210/506;
   (Continued)

(56) References Cited

U.S. PATENT DOCUMENTS 5,978,473 A * 11/1999 Rasmusson ........ H03H 21/0012
                                                    379/406.08
6,522,746 B1 * 2/2003 Marchok ................. G10L 25/78
                                                    379/406.01
(Continued)

FOREIGN PATENT DOCUMENTS

EP         1020068 B1    12/2002
EP         1367856 A2    12/2003

*Primary Examiner* — Fan S Tsang
*Assistant Examiner* — Sean M Rinehart
(74) *Attorney, Agent, or Firm* — Laurence A. Greenberg; Werner H. Stemer; Ralph E. Locher (57) ABSTRACT

A method reduces echo in a hearing instrument. A first input transducer generates a first input signal from ambient sound. A communication unit receives an external input signal from an external device. The first input signal and the external input signal are used to generate an output signal. The output signal is used in a first filter to generate a compensation signal for reducing echo and/or acoustic feedback. The first input signal and the compensation signal are used to generate an error signal. Filter coefficients of the first filter and/or a comparison of the error signal with the compensation signal and/or with the first input signal are/is used to generate a control variable. The control variable is taken as a basis for applying a second filter for rejecting a residual echo or a residual feedback to an intermediate signal derived from the input signal, and a transmission signal is generated.

17 Claims, 4 Drawing Sheets

(52) U.S. Cl.
CPC .............. *G10K 2210/1081* (2013.01); *G10K 2210/3026* (2013.01); *G10K 2210/3027* (2013.01); *G10K 2210/3028* (2013.01); *G10K 2210/3056* (2013.01); *G10K 2210/505* (2013.01)

(58) Field of Classification Search
CPC .. H04R 2201/107; H04R 25/453; H04R 3/00; H04R 2430/00; H04M 9/082; H04M 3/002; H04M 3/34; H04B 3/234; H04S 2400/01
USPC .......................................................... 381/66
See application file for complete search history.

(56) References Cited

U.S. PATENT DOCUMENTS

| | | | |
|---|---|---|---|
| 6,622,030 B1 * | 9/2003 | Romesburg | H04M 9/082 |
| | | | 379/406.01 |
| 7,203,328 B2 | 4/2007 | Beimel et al. | |
| 2002/0181698 A1 * | 12/2002 | Takahashi | G10L 21/0208 |
| | | | 379/406.01 |
| 2005/0063536 A1 * | 3/2005 | Myllyla | H04M 9/082 |
| | | | 379/406.05 |
| 2005/0286714 A1 | 12/2005 | Tokuda | |
| 2010/0303228 A1 * | 12/2010 | Zeng | H04M 9/082 |
| | | | 379/406.08 |
| 2016/0180830 A1 * | 6/2016 | Lu | G10K 11/17885 |
| | | | 381/71.6 |
| 2020/0322738 A1 | 10/2020 | Elmedyb et al. | |
| 2021/0028819 A1 * | 1/2021 | Huang | H04B 3/20 |

\* cited by examiner

METHOD FOR REDUCING ECHO IN A HEARING INSTRUMENT AND HEARING INSTRUMENT

CROSS-REFERENCE TO RELATED APPLICATION

This application claims the priority, under 35 U.S.C. § 119, of German Patent Application DE 10 2022 201 942.3, filed Feb. 24, 2022; the prior application is herewith incorporated by reference in its entirety.

FIELD AND BACKGROUND OF THE INVENTION

The invention relates to a method for reducing echo in a hearing instrument, wherein an electroacoustic first input transducer of the hearing instrument generates a first input signal from ambient sound. A communication unit of the hearing instrument is used to receive an external input signal from an external communication device. The first input signal and the external input signal of the hearing instrument are used to generate an output signal. An intermediate signal derived from the input signal is used to generate a transmission signal, and the transmission signal is transmitted to the external communication device by means of the communication unit.

A hearing instrument should be understood in general to mean any apparatus that is configured to generate a sound signal from an electrical signal—which may also be provided by an internal signal of the apparatus—and to supply the sound signal to the ear of a wearer of this apparatus, that is to say in particular headphones (e.g. in the form of an "earplug"), a headset, smart glasses with a loudspeaker, etc. Hearing instruments of the cited type increasingly also have one or more microphones, e.g. in order to control individual functions by means of voice commands, such as for example selecting a title from a music library. However, hearing instruments of the cited type are increasingly also used in conjunction with mobile communication devices such as e.g. smartphones, tablet PCs or smartwatches, etc., the microphone(s) of the hearing instrument being able to use voice commands to control individual functions of the communication device (e.g. by way of a Bluetooth connection or the like between the hearing instrument and the communication device).

Hearing instruments such as these are increasingly also used in conjunction with a communication device of the cited type to complement the telecommunication functions of the communication device, that is to say in particular for calls via a mobile radio network or VoIP calls. In this case, the microphone(s) of the hearing instrument is/are used to record the voice signal from a wearer of the hearing instrument (who is also the user of the communication device), and the communication device is used to transmit said voice signal to an interlocutor. This usually takes place without further contributions from an audio signal recorded in the communication device itself by way of separate microphones therein. An audio signal containing the voice contributions of the interlocutor that has been recorded by a communication device (e.g. a telephone or the like) of the interlocutor is transmitted to the present communication device and is forwarded from the latter to the hearing instrument. There, the audio signal containing the voice contributions of the interlocutor is routed to an output transducer (that is to say e.g. a loudspeaker) of the hearing instrument, and so the wearer can hear the voice contributions as a result of the reproduction of the audio signal.

However, this can lead to acoustic feedback from the voice contributions of the interlocutor to the microphone of the hearing instrument and therefore to the voice contributions being coupled into the signal that is to be transmitted to the interlocutor. The interlocutor will then hear his own voice contributions as echo with a delay of between several 10 ms and several 100 ms (depending on the type of connection), which is irritating.

SUMMARY OF THE INVENTION

The invention is therefore based on the object of specifying a method for operating a hearing instrument that involves the cited type of echo being rejected as effectively as possible and that can be implemented in the hearing instrument as efficiently as possible.

The cited object is achieved according to the invention by way of a method for reducing echo in a hearing instrument, wherein an electroacoustic first input transducer of the hearing instrument generates a first input signal from ambient sound. A communication unit of the hearing instrument is used to receive an external input signal from an external communication device. The first input signal and the external input signal are used, in particular in a signal processing unit of the hearing instrument, to generate an output signal. The output signal is used in an adaptive first filter to generate a compensation signal for reducing echo and/or acoustic feedback, and wherein the first input signal and the compensation signal are used to generate an error signal, which is supplied in particular to the adaptive first filter as an input variable.

In accordance with the method, there is provision for filter coefficients of the first filter and/or a comparison of the error signal with the compensation signal and/or with the first input signal to be used to generate a control variable, for the control variable to be taken as a basis for applying a second filter for rejecting a residual echo or a residual feedback to an intermediate signal derived from the input signal and in particular from the error signal, and for this to generate a transmission signal, and for the transmission signal to be transmitted to the external communication device by means of the communication unit. Refinements that are advantageous and in some cases inventive in themselves are the subject matter of the subclaims and the description that follows.

A hearing instrument should be understood in general to mean an apparatus of the type described above, that is to say in particular headphones (e.g. in the form of an "earplug"), a headset, smart glasses with a loudspeaker, etc. However, a hearing instrument moreover also includes a hearing device in the narrower sense, that is to say a device for catering for a hearing loss of the wearer, in which an input signal generated from a surroundings signal by means of a microphone is processed to produce an output signal and, during the processing, is amplified, in particular according to a frequency band, and an output sound signal generated from the output signal (or from a reproduction signal derived from the output signal) by means of a loudspeaker or the like is suitable for at least partly compensating for the hearing loss of the wearer, in particular on a user-specific basis.

The hearing instrument preferably has a communication mode in which a voice call using an external communication device is possible by means of the communication unit and a communication device associated with the hearing instrument via an appropriate connection. The external communication device is preferably provided by a landline telephone, mobile phone, a tablet PC or the like belonging to an interlocutor of a wearer of the hearing instrument, the communication device associated with the hearing instrument being provided by a mobile phone of the wearer, which can be connected to the hearing instrument via Bluetooth or the like, and is preferably also connected for the communication mode of the hearing instrument.

However, the hearing instrument may in particular also be configured to set up a connection to the external communication device by way of WLAN and an appropriate Internet connection in the communication mode in order to receive the external input signal from the external communication device, and transmit the transmission signal thereto.

The communication unit is preferably provided in the form of an antenna or in the form of another appropriately suited and configured transmission/reception apparatus in the hearing instrument.

The output signal is preferably generated in such a way that, in the communication mode, during a voice call that the wearer conducts using the hearing instrument, the external input signal, which preferably contains the voice contributions of an interlocutor on the voice call, together with the first input signal (which in particular contains the personal voice contributions of the wearer of the hearing instrument) are included. The two aforementioned input signals can also be subjected to further processing steps when the output signal is generated, in particular further signals can be added and/or subtracted. The output signal can then preferably be reproduced as a reproduction signal by an output transducer of the hearing instrument (e.g. a loudspeaker). However, if the second filter is applied to the output signal from the signal processing, the reproduction signal can in particular also be provided by the transmission signal resulting therefrom.

In general, generation of a resultant signal on the basis of a previous signal is intended, here and below, to mean that the signal components of the previous signal are included in the resultant signal at least in a number of frequency bands, the signal components of further signals moreover also being able to be included too, or applicable signal components of other signals being able to be subtracted from the previous signal or a signal derived therefrom. In particular, a frequency-band-oriented amplification and frequency-band-oriented compression are also possible when processing the previous signal to produce the resultant signal. Apropos this, the resultant signal is derived from the previous signal if it is generated on the basis of the previous signal (in the context described here).

The adaptive first filter for generating the compensation signal preferably receives the error signal as an input variable, and preferably models a corresponding acoustic feedback path from an output transducer of the hearing instrument, which reproduces the output signal (or a reproduction signal derived therefrom), to the first input transducer, with the result that the application of the first filter to the output signal provides an assessment of the acoustic feedback. The error signal is preferably generated on the basis of a subtraction and particular preferably as the subtraction of the compensation signal from the first input signal.

The echo is then obtained in particular as a result of the external input signal (or signal components thereof) reproduced by way of the output transducer being coupled into the first input transducer in the form of acoustic feedback and therefore into the intermediate signal generated on the basis of the input signal. If the intermediate signal is transmitted to the external communication device, then an interlocutor of the wearer will hear his voice contributions—which are fed back to him as described—as an echo there when the transmitted intermediate signal is reproduced. Consequently, the intermediate signal is processed further by means of the second filter to produce the transmission signal, in order to reject this echo caused in particular by the acoustic feedback of the external input signal. The first filter can achieve rejection of the acoustic feedback, or of the echo, in particular the echo of the type described, in a manner that is known in the prior art.

The error signal is then compared with the compensation signal, the comparison being able to take place for example by way of a pure comparison of magnitudes of the amplitudes or of the squares of the absolute values or of the signal levels. For this purpose, the compensation signal and/or the error signal can also be smoothed over time beforehand, e.g. by way of recursive averaging or the like.

The comparison of the compensation signal with the error signal is used to produce a control variable, according to which the second filter is operated. As such, e.g. the control variable can merely consist of a binary value that is determined from an arithmetic sign of a comparison of the magnitudes of the amplitudes or signal levels (or squares of the absolute values or generally any monotonous function of the absolute values) of the two aforementioned signals. According to this binary value, the second filter is then "switched on", or not, with previously stipulated parameter values.

However, the control variable can also consist of a continuously monotonous function of the amplitudes or signal levels (or the like) of the error signal and the compensation signal, the second filter firstly being applied or "bypassed" (or the second filter being switched off) according to the arithmetic sign of said function, and, if the second filter is applied, the strength of application in turn being dependent on the value of the control variable, that is to say in particular varying with the amplitudes of the two aforementioned signals. In particular, the control variable (as an alternative or in addition to the compensation signal and/or error signal) can also be smoothed over time.

Alternatively or in addition, in one refinement according to the invention the control variable is ascertained on the basis of filter coefficients of the first filter. This can take place in particular on the basis of latency coefficients. Owing to the acoustic time of flight between an output transducer of the hearing instrument and the first input transducer, a feedback path modelled by the first filter will necessarily have a number of coefficients, all of which are identical to zero. These are the coefficients that model the transfer function of the feedback path at an instant before the arrival of the output sound that is actually fed back.

On the one hand, these coefficients can by definition be set to zero, and the first filter can be "shifted" in time accordingly. On the other hand, however, these coefficients can also be adapted too. The interval between these coefficients and zero then serves as an indicator of how well the first filter actually represents the real acoustic feedback path. Apropos this, it is possible to exploit the fact that errors in the adaptation are "on average" distributed evenly over the individual coefficients of a filter. The sum of the squares of the relevant coefficients, which ought to be zero according to the propagation delay, normalized over the total energy of all coefficients, thus allows a quantitative measure of the precision of the adaptation to be obtained. This measure can then be used to ascertain the control variable (e.g. by way of a functional dependency, or by way of a lookup table according to the aforementioned normalized sum of the squares of the so-called "latency coefficients" described here).

The second filter is configured to reject residual feedback that still remains in the error signal after application of the adaptive first filter to reject the feedback. The second filter is applied to an intermediate signal derived from the error signal, this in particular also encompassing the trivial case of derivation wherein the intermediate signal is provided by the error signal itself. In this case, the reproduction signal converted into an output sound signal by an output transducer of the hearing instrument is provided by the output signal.

However, the second filter can also be applied to the output signal that has been generated from the error signal by way of a signal processing (containing in particular user-specific and frequency-band-oriented amplification and/or compression and also possibly noise reduction and/or directional microphonics by means of a second input signal of the hearing instrument).

The second filter can be implemented e.g. by way of a gain or attenuation factor for the intermediate signal and/or a compression (or a change in the parameters of the compression such as e.g. compression ratio or knee of the characteristic curve). Whereas the second filter can also operate in the time domain in principle, it is preferably implemented in the time/frequency domain, and can be used in a frequency-band-oriented manner there (that is to say for example by way of frequency-band-dependent gain factors for attenuating the intermediate signal). A frequency-band-oriented adaptive filter is likewise possible, which preferably has multiple filter coefficients for individual frequency bands in the time/frequency domain, and is implemented by way of appropriate convolution with the intermediate signal in the respective frequency band.

The intermediate signal filtered by the second filter is then transmitted to the external communication device as the transmission signal.

The invention exploits the fact that, owing to the accordingly configured first filter (by means of which feedback is meant to be rejected), the compensation signal contains more components of the feedback external input signal and therefore the voice contributions of the interlocutor, whereas the error signal, following elimination of the feedback, essentially contains the voice contributions of the wearer of the hearing instrument. The rejection of the feedback by the compensation signal generated by means of the first filter is not complete, which is why the residual feedback still needs to be rejected by means of the second filter. However, the time information concerning the voice contributions of the wearer and his interlocutor that is already contained in the compensation signal and accordingly also in the error signal can be used for applying the second filter:

If the signal level, or the signal amplitude, in the compensation signal is greater than in the error signal, in particular over a period of time relating to a multiplicity of samples (such as e.g. a frame), then it can be assumed that the interlocutor is active in this period of time, and accordingly his voice contributions are contained in the external input signal, whereas the wearer is not speaking. Conversely, the signal level and amplitude in the error signal are greater if the wearer is speaking, but not the interlocutor.

The comparison of the cited signals and the control variable formed in the process then accordingly allow the voice contributions of the interlocutor to be identified, and rejected in the intermediate signal by the second filter, before the transmission signal formed therefrom is transmitted to the external communication device carried by the interlocutor. This prevents an echo for the interlocutor that could arise in the event of his own returned voice contributions being reproduced.

A great advantage in this instance lies in the use of the error signal and the compensation signal for controlling the rejection of the residual feedback, since these two signals are provided by the adaptive first filter in any case, and therefore no further processing power (or corresponding hardwired components for signal processing) is required.

Advantageously, the second filter is applied to the intermediate signal according to an arithmetic sign of the logarithm of the control variable. This means in particular that it is not applied for a positive arithmetic sign if it is applied for a negative arithmetic sign. The control variable therefore serves as a "switch" for the second filter by way of the arithmetic sign of the logarithm—or preferably a comparable, in particular equivalent, mathematical implementation.

It is found to be advantageous if the control variable is formed on the basis of a quotient of the amplitudes, the absolute values, the squares of the absolute values and/or the signal levels of the error signal and the compensation signal. In particular, if the method is implemented in a frequency-band-oriented manner, different instances of the cited characteristic variables of the two signals for different frequency bands can be used for forming the respective quotient in the frequency band. In particular, the respective characteristic variables can also be smoothed over time before quotient formation, for example by means of recursive averaging. A quotient can be used to particularly easily assess whether the signal contributions in the compensation signal are predominant, or in the error signal.

The second filter preferably has a continuously monotonous dependency on the control variable. Particularly preferably, the second filter is applied to the intermediate signal according to the arithmetic sign of the logarithm of the control variable (or a mathematically equivalent function). By way of example, a gain factor for attenuating the intermediate signal can be applied to the intermediate signal as a monotonous function of the control variable if it is recognized from the arithmetic sign of the logarithm of the control variable that the signal contributions in the compensation signal are predominant.

In an advantageous alternative, the second filter is operated with a previously stipulated parameter value that is in particular independent of an absolute value of the control variable. This means in particular that the control variable is used merely as said "switch" for the second filter, but the second filter has no further dependency on the absolute value of the control variable (if the arithmetic sign of the logarithm is constant). Operation with previously stipulated parameters such as e.g. gain factors for a fixed attenuation saves further computing resources in this case.

In advantageous refinements, the second filter applies a gain factor and/or a compression to the intermediate signal in order to attenuate it, wherein, in the case of compression, in particular a compression parameter, e.g. a compression ratio and/or a knee of a compression characteristic curve, can be set as a (in particular continuously monotonous) function of the control variable.

The second filter is preferably applied to a number of frequency bands of the intermediate signal in the time/frequency domain. The second filter can then apply individual frequency-band-oriented gain factors and/or compressions to at least some frequency bands of the intermediate signal.

In particular, the second filter can alternatively or additionally be applied to the intermediate signal in a number of frequency bands as a second adaptive filter with more than one filter coefficient in each case. This means that the rejection of the feedback is split into the first filter and, in individual frequency bands in which the residual feedback results in the voice contributions of the interlocutor being returned to him as echo, into the adaptive second filter. The second filter can then be implemented e.g. as an FIR or IIR filter by means of a convolution of at least two samples of the intermediate signal in the frequency band, filter coefficients being able to be ascertained by way of an NLMS algorithm, for example.

A non-linear processing, in particular a frequency distortion such as e.g. a frequency shift, is expediently applied to the intermediate signal or to a signal of the hearing instrument that is derived from the intermediate signal in order to generate a reproduction signal. The reproduction signal is preferably reproduced by an electroacoustic output transducer of the hearing instrument. This allows the reproduction signal to be additionally decorrelated from the input signals in order to interrupt the feedback loop formed from the acoustic feedback path around the hearing instrument and from its internal signal amplification.

In an advantageous refinement, the compensation signal is generated on the basis of the output signal or the transmission signal to which the first filter is applied, wherein the first filter is adapted on the basis of the error signal. The error signal is used by the first filter as a measure of the quality of the adaptation (e.g. in an NLMS algorithm).

The intermediate signal used is preferably directly the error signal or the output signal. In the case of the output signal, the error signal thus also undergoes the internal signal processing of the hearing instrument, which is therefore also included in the transmission signal. If the transmission signal is not meant to be influenced by the internal signal processing of the hearing instrument, the intermediate signal used is the error signal, from which the transmission signal is generated through the application of the second filter.

The invention also mentions a hearing instrument, containing an electroacoustic first input transducer for generating a first input signal from ambient sound, a communication unit for receiving an external input signal from an external communication device and for transmitting a transmission signal of the hearing instrument to the external communication device, and a signal processing unit configured to use the first input signal and the external input signal to generate an output signal. An adaptive first filter is implemented in the hearing instrument in this instance, the first filter being configured to use the output signal to generate a compensation signal for reducing echo and/or acoustic feedback, wherein the signal processing unit is further configured to use the first input signal and the compensation signal to generate an error signal, and to use a comparison of the error signal with the compensation signal to generate a control variable. Furthermore, a second filter is implemented in the hearing instrument, said second filter being configured to reject a residual echo or a residual feedback in an intermediate signal derived from the input signal and in particular from the error signal, and thereby to generate the transmission signal.

The hearing instrument according to the invention shares the benefits of the method according to the invention. The advantages indicated for the method and for its developments can be transferred, mutatis mutandis, to the hearing instrument. Advantageous embodiments of the method are preferably implemented by corresponding refinements of the hearing system.

Other features which are considered as characteristic for the invention are set forth in the appended claims.

Although the invention is illustrated and described herein as embodied in a method for reducing echo in a hearing instrument, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Mutually corresponding parts and variables are each provided with the same reference signs throughout the figures.

Figure 1:
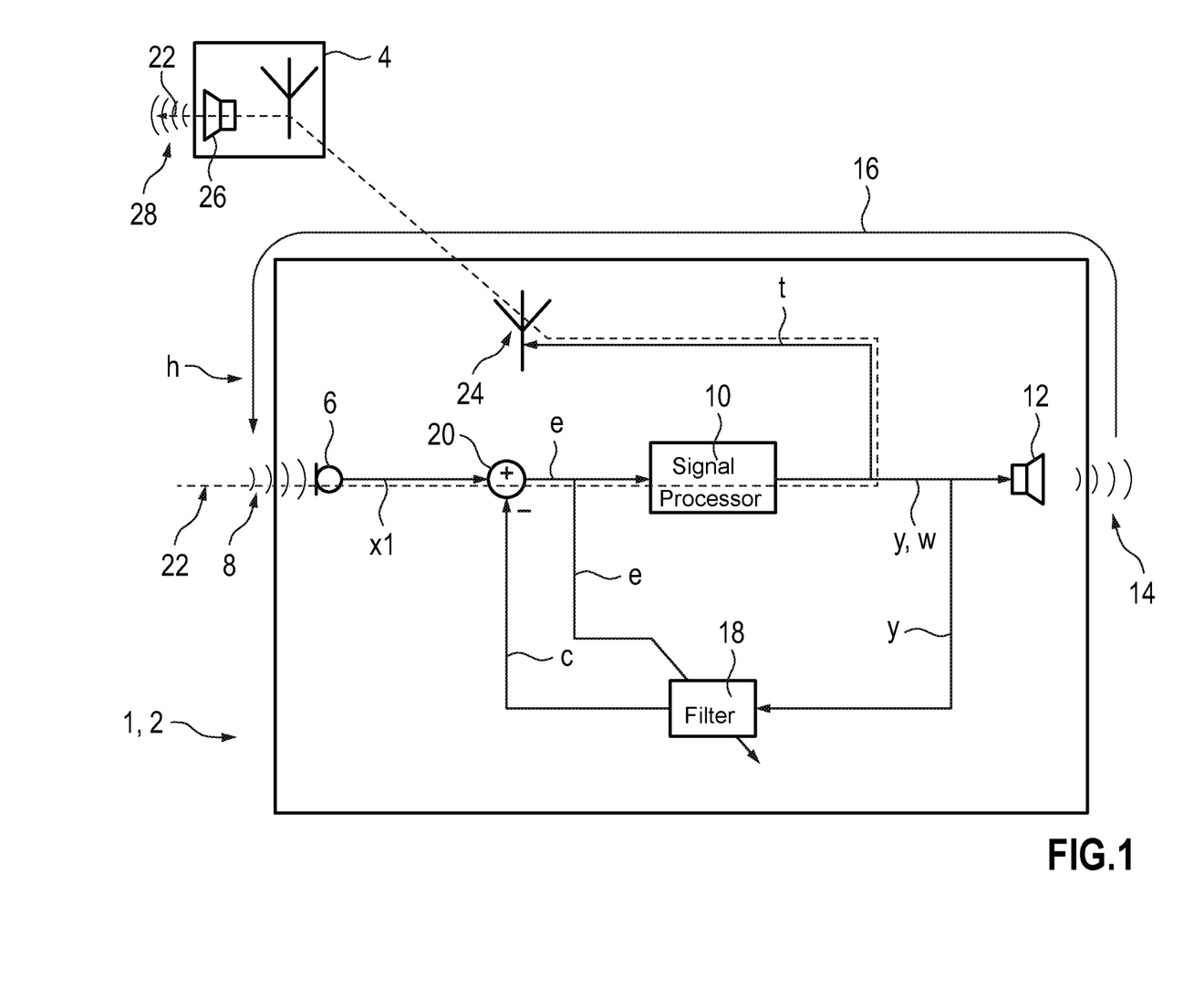
FIG. 1 is a block diagram schematically showing a hearing instrument by means of which voice contributions of the wearer are transmitted to an external communication device in a trunk call.

Referring now to the figures of the drawings in detail and first, particularly to FIG. 1 thereof, there is shown a block diagram to schematically show a hearing instrument 1, which is provided by a hearing device 2 (in the narrower sense) in the present case. The hearing instrument 1 is configured so that a wearer (not shown) of the hearing instrument 1 is able to use it to conduct a trunk call, that is to say e.g. a telephone or VoIP call, with an interlocutor (not shown), who for his part does so using a communication device such as for example a mobile phone, shown as an external communication device 4 in FIG. 1.

The hearing instrument 1 contains an electroacoustic first input transducer 6, which is provided by a microphone in the present case, and which is configured to generate a first input signal x1 from ambient sound 8 in the hearing instrument 1. In a manner yet to be described, the first input signal x1 is supplied to a signal processing unit 10, in which signal components of the first input signal x1 are used to generate an output signal y. The output signal y is converted, as a reproduction signal w, into output sound 14 by an electroacoustic output transducer 12 of the hearing instrument 1. The output transducer 12 is provided by a loudspeaker in the present case. From the output transducer 12, portions of the output sound 14 reach the first input transducer 6 via an acoustic feedback path 16, which means that this causes an acoustic feedback h of the output signal Y. The hearing instrument can also comprise a second input transducer (not shown), which accordingly generates a second input signal that is processed together with the first input signal, in particular by means of directional microphonics.

To reject the feedback h, an adaptive first filter 18 is implemented in the hearing instrument 1, the first filter being applied to the output signal y and generating a compensation signal c from the latter. The compensation signal c is subtracted from the first input signal x1 at a first node 20, with the result that an error signal e is generated therefrom. The error signal e is applied to the adaptive first filter 18 in order there to assess the quality of the adaptation on the basis of the error signal e. The first filter 18 and the first node 20 can be physically implemented in the signal processing unit 10, which processes the error signal e further by way of a signal processing, which is tuned in particular individually to audiological needs of the wearer, by means of frequency-band-dependent amplification and/or compression to produce the output signal y. For reasons of clarity, the signal processing unit 10 in FIG. 1 should be regarded merely as the blog of the signal processing in which the "actual" processing of the error signal e to produce the output signal y takes place, however.

In the trunk call, voice contributions 22 of the wearer of the hearing instrument 1 are recorded in the first input signal x1 by the first input transducer 6, reduced by the compensation signal c at the node 20 to correct the acoustic feedback h, and processed in the signal processing unit 10 to produce the output signal y (dashed line). Further algorithms for noise reduction and/or speech enhancement can also be performed during the processing. The output signal y is supplied as a transmission signal t to a communication unit 24 of the hearing instrument 1, which can be provided e.g. as an antenna for Bluetooth or WLAN. The communication unit 24 is then used to transmit the transmission signal t containing the voice contributions 22 of the wearer to the external communication device 4. There, a loudspeaker 26 is used to produce external reproduction sound 28 from the transmission signal t, with the result that the interlocutor can accordingly hear the voice contributions 22.

The transmission signal t can be transmitted to the external communication device 4 in particular using a local communication device (not shown) of the wearer of the hearing instrument 1 that is connected to the hearing instrument 1 via the communication unit 24 and forwards the transmission signal t to the external communication device 4. The local communication device can be provided in particular in the form of a smartphone or the like. However, the hearing instrument 1 can also have an Internet connection directly via the communication unit 24 using WLAN, with the result that the trunk call with the external communication device 4 is performed as a VoIP call.

Figure 2:
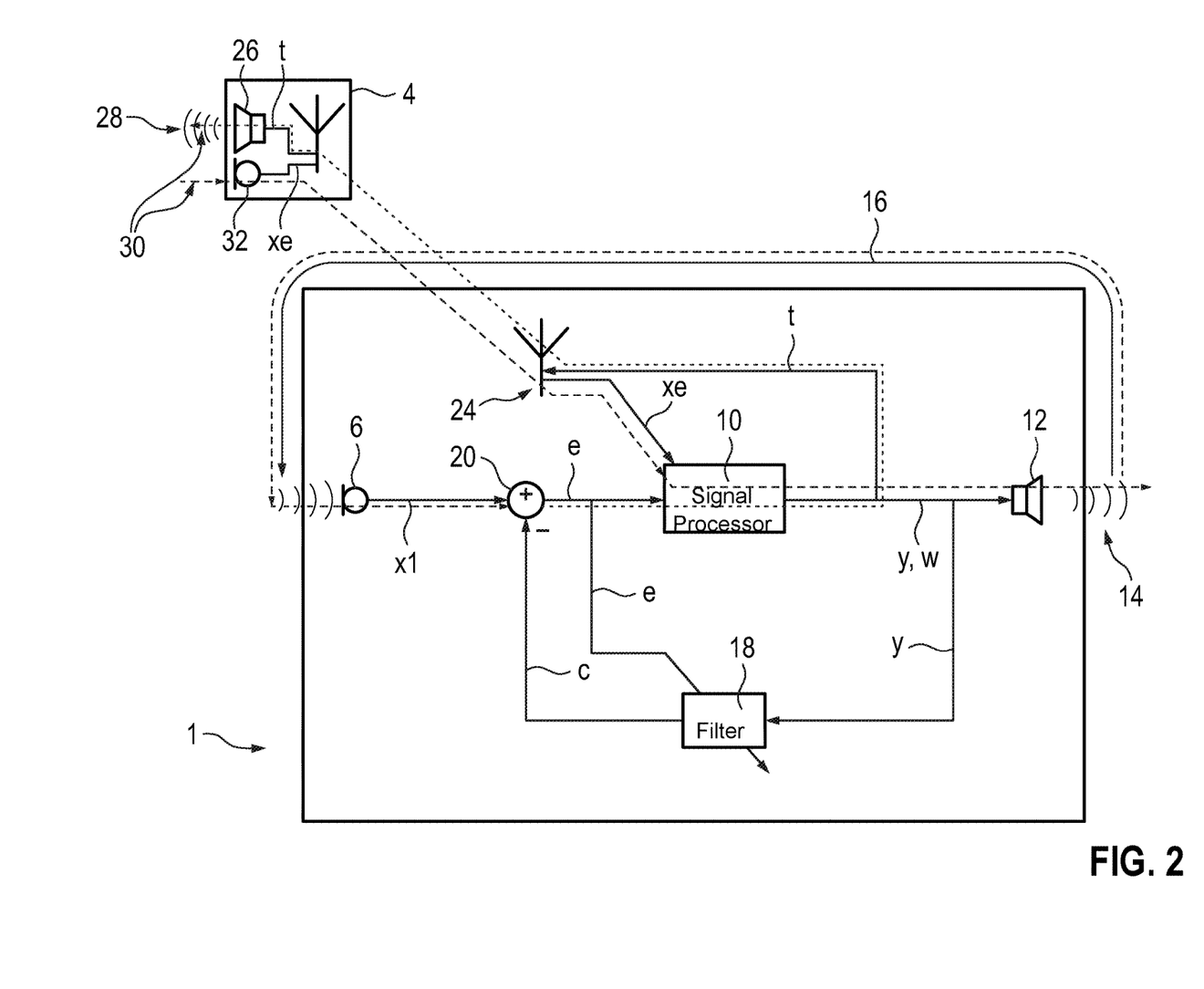
FIG. 2 is a block diagram schematically showing the hearing instrument shown in FIG. 1, by means of which voice contributions of the interlocutor, which suffers feedback, are received in the trunk call.

FIG. 2 uses a block diagram to schematically show the hearing instrument 1 shown in FIG. 1 for the case in which the interlocutor in the trunk call now speaks. A microphone 32 of the external communication device 4 is used to generate an external input signal xe that contains voice contributions 30 (dashed line) of the interlocutor. The external input signal xe containing the voice contributions 30 is transmitted to the hearing instrument 1, where it is received by means of the communication unit 24. The transmission in this instance takes place in the manner just described.

The external input signal xe is then processed in the signal processing unit 10 together with the error signal e to produce the output signal y. The error signal e, which, as shown in FIG. 1, contains the personal voice contributions 22 of the wearer of the hearing instrument 1, is taken into the output signal y (and therefore into the reproduction signal w) too, since otherwise it would be disagreeable for the wearer not to hear his own voice in the output sound 14 when he speaks.

However, FIG. 2 merely shows the voice contributions 30 of the interlocutor in the output signal y and accordingly in the output sound 14. Via the acoustic feedback path 16 from the output transducer 12 to the first input transducer 6, the voice contributions 30 of the interlocutor find their way into the first input signal x1 (and possibly into a second input signal of a second microphone of the hearing instrument), and therefore also into the error signal e. Accordingly, these voice contributions are again converted into the output signal y following processing in the signal processing unit 10 (and amplification that takes place in the process). The voice contributions 30 have therefore passed through a closed feedback loop in the hearing instrument 1 once. Since the output signal y is then transmitted to the external communication device 4 as transmission signal t, from which the loudspeaker 26 there generates the external reproduction sound 28, the voice contributions 30 of the interlocutor accordingly become audible to the interlocutor in the external reproduction sound 28 as echo.

Even though the feedback is rejected by the adaptive first filter 18, this rejection is normally 15 dB to 25 dB. However, it is recommended (by the ITU-T, inter alia) that the reinjection of the "telecommunications signal" (that is to say the received signal) as a result of acoustic feedback in trunk calls by means of hearing instruments be rejected by at least 35 dB. The residual feedback that remains following the rejection by means of the first filter 18 can therefore be referred to as highly relevant. The voice contributions 30 thus remain in the error signal e (dotted line), albeit to a lesser extent, even following correction of the acoustic feedback h by way of the compensation signal c, and are accordingly transmitted to the external communication device 4, where they are output in the external reproduction sound 28 as well.

Figure 3:
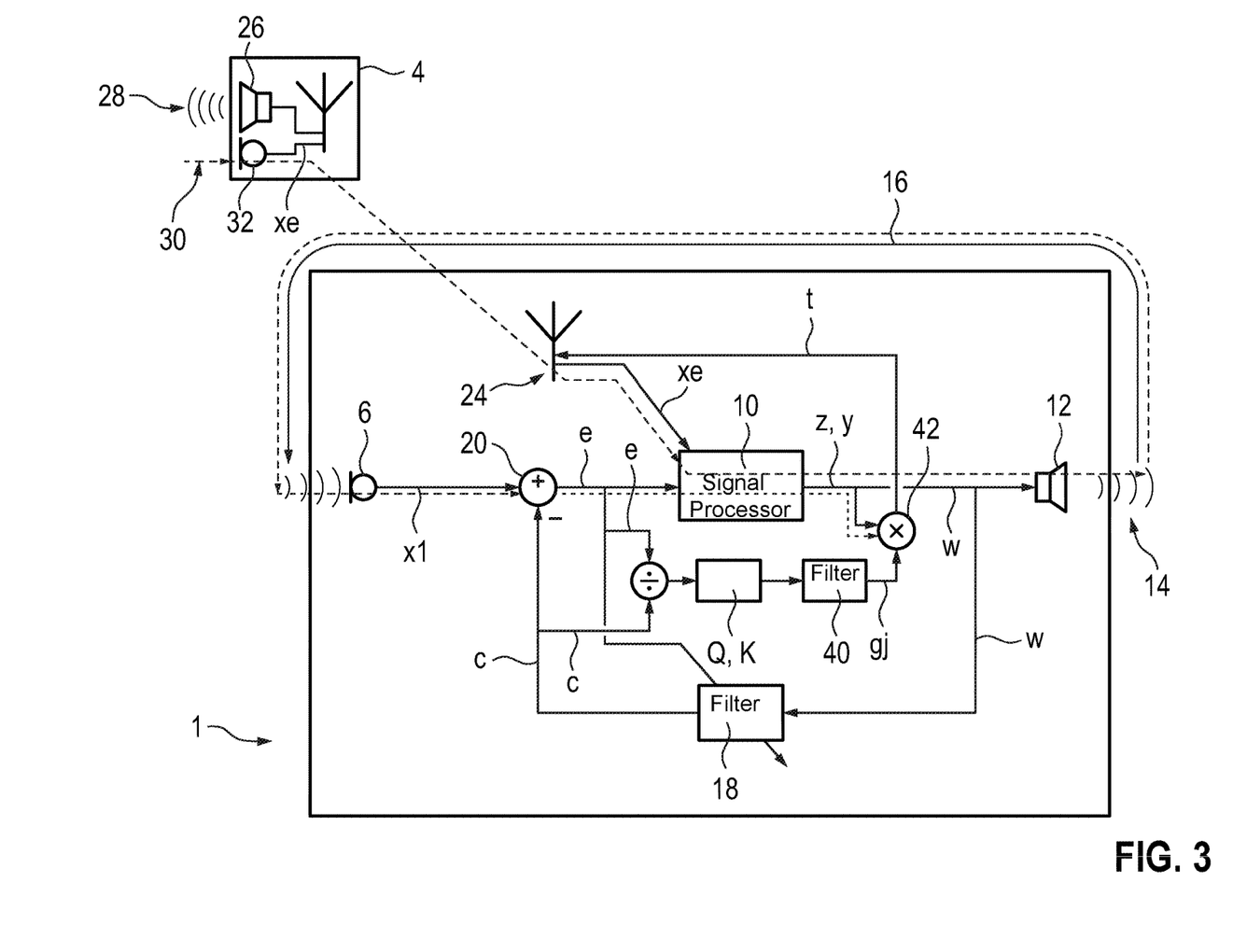
FIG. 3 is a block diagram schematically showing a refinement of the hearing instrument shown in FIG. 1 that allows the feedback shown in FIG. 2 to be rejected.

FIG. 3 uses a block diagram to schematically show a development of the hearing instrument 1 shown in FIG. 1 and FIG. 2 that facilitates rejection of the residual feedback. For the sake of clarity, only the signal flow for the voice contributions 30 of the interlocutor, who communicates at the location of the external communication device 4 and directly by way of the latter, is shown in this instance. However, at the same time or in quick succession, voice contributions 22 of the wearer of the hearing instrument 1 as shown in FIG. 1 also take place. For these, the signal flow is in accordance with that shown in FIG. 1.

As in the trunk call shown using FIG. 2, the external communication device 4 in FIG. 3 also uses the microphone 32 to generate the external input signal xe containing the voice contributions 30 of the interlocutor. As far as the first node 20, the signal flow for the external input signal xe and therefore for the voice contributions 30 (dashed and dotted lines) corresponds to the signal flow shown in FIG. 2 with the exception of a second node 42, which has been newly added in the signal flow, and the resultant consequences, which are described below.

However, the hearing instrument 1 in the present exemplary embodiment according to the invention now has a second filter 40 that is intended and configured to reject the residual feedback (following compensation by way of the compensation signal c). This second filter 40 should be applied in a general way to an intermediate signal z that is derived from the input signal x1 (which of course includes the voice contributions 30 propagated via the acoustic feedback path 16) and in particular from the error signal e (which of course has already been cleared of feedback by the compensation signal c). In the present case, the intermediate signal z is provided by the output signal y that results from the signal processing unit 10, to which output signal, as described below, individual gain factors gj are applied in a frequency-band-oriented manner by the second filter 40 at the second node 42. The intermediate signal z therefore corresponds to the output signal y shown in FIGS. 1 and 2. However, the intermediate signal z can also be provided by the error signal e in another embodiment, which is not shown.

The second filter 40 can also apply a compression to the intermediate signal z in individual frequency bands, and/or can operate as a "genuine" adaptive filter, individual filter coefficients being able to be determined by way of an NLMS algorithm, for example. The second filter 40 and the control explained therefor below can preferably be physically implemented in the signal processing unit 10, but for reasons of clarity for the representation in FIG. 3 are separated from the "actual" signal processing (e.g. frequency-band-oriented amplification, in particular according to audiological requirements of the wearer, etc.).

For the operation of the second filter 40, a respective quotient Q is formed from the error signal e and the compensation signal c in a frequency-band-oriented manner. This quotient Q forms a control variable K for the second filter 40. First, the arithmetic sign of the logarithm of the quotient Q (or equivalently a >/< comparison of the quotient with 1) ascertains those temporal signal components in the first input signal x1, or in the error signal e, that contain voice contributions 30 of the interlocutor. For these, the second filter 40 is inherently applied to the output signal y, the frequency-band-oriented gain factors gj likewise being dependent on the value of the quotient Q. If there are no voice contributions 30 from the interlocutor, however, it is also not necessary to reject a residual feedback, since the interlocutor will not hear any echo.

Figure 4:
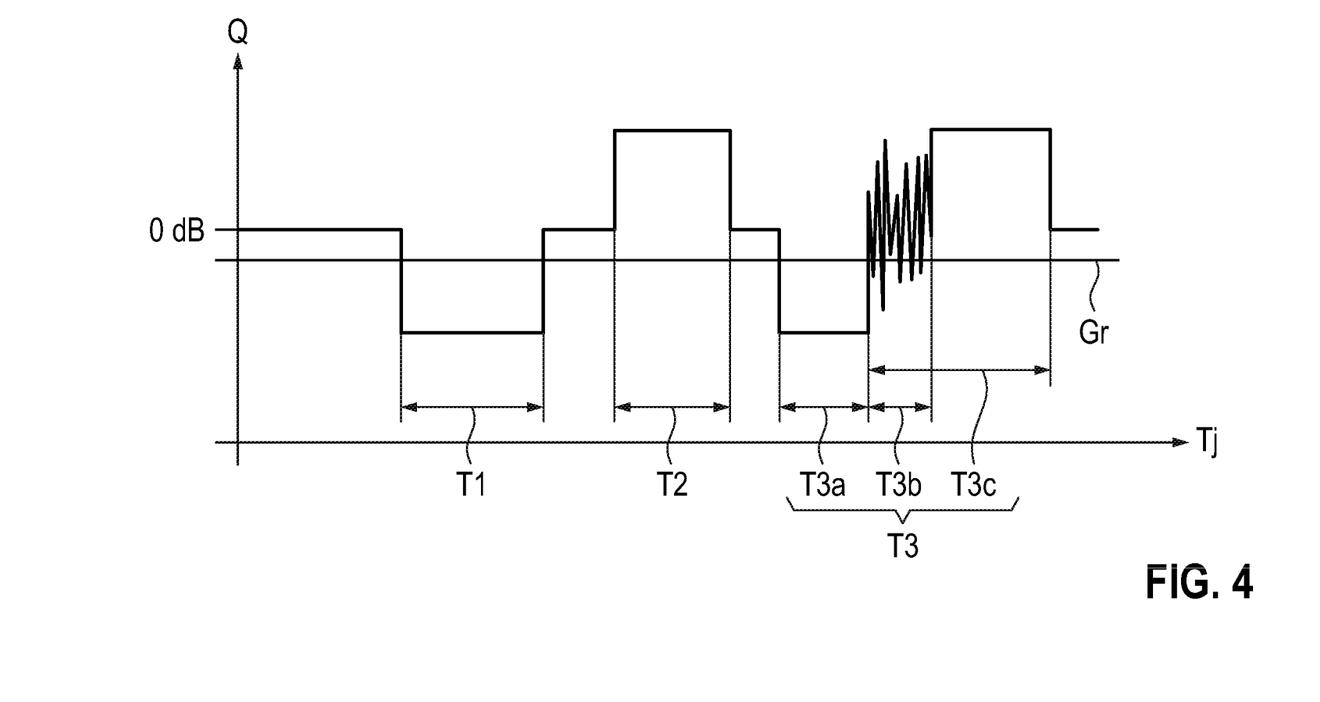
FIG. 4 is a timing diagram schematically showing a control variable for rejecting the feedback in the refinement shown in FIG. 3.

The dependency of the application of the second filter 40 on the quotient Q as the control variable K in the respective frequency band is briefly outlined on the basis of FIG. 4. FIG. 4 shows the quotient Q, in dB, of the error signal e and the compensation signal c shown in FIG. 3, plotted against a time axis Tj, for one frequency band, which is not determined in more detail.

In a first time window T1, the value of the quotient Q is below 0 dB, that is to say that the compensation signal c is predominant. Since the error signal includes the voice contributions 22 of the wearer of the hearing instrument 1, whereas the compensation signal c, as a representation of the feedback output signal y, may contain both voice contributions 22, 30 (depending on who is speaking), it can be assumed if the compensation signal c is predominant over the error signal e that essentially only voice contributions 30 of the interlocutor are present. In this case—that is to say for the first time window T1—the second filter 40 shown in FIG. 3 is applied to the output signal y.

In a second time window T2, the value of the quotient Q is above 0 dB, that is to say that the error signal e is predominant. The second filter 40 therefore remains switched off (for the period between the first and second time windows T1, T2 the value of the quotient is exactly 0 dB, and it is therefore assumed that neither the wearer nor the interlocutor is speaking; the second filter 40 also remains switched off for Q=0 dB).

In a first segment T3a of a third time window T3, the value of the quotient Q is initially below 0 dB; in a subsequent second segment T3b of the third time window T3, the quotient fluctuates strongly around 0 dB, and then assumes a stable value above 0 dB in a third segment T3c of the third time window T3. As in the first time window T1, the first segment T3a is assumed to involve voice contributions 30 only from the interlocutor, and the second filter 40 is accordingly applied. As in the second time window T2, the third segment T3c is assumed to involve voice contributions 22 only from the wearer of the hearing instrument 1, and the second filter 40 is accordingly switched off.

For the second segment T3b, the dominance of the error signal e and the compensation signal c alternates quickly, both voice contributions 22, 30 existing simultaneously alongside one another (the arithmetic sign of Q/[dB] then follows rather random fluctuations of the two voice contributions 22, 30): the wearer and the interlocutor speak simultaneously or interrupt one another. Here too, the second filter 40 can be operated in the time/frequency domain according to the arithmetic sign of Q/[dB]: different frequency bands will contain frequency contributions from the two speakers more often than not at separate times (i.e. owing to the frequencies of speech, it can be assumed that the wearer and his interlocutor seldom simultaneously occupy a frequency bin in the time/frequency domain). FIG. 4 shows an upper limit value Gr for the quotient Q for the application of the second filter 40 shown in FIG. 3, above which the application is suspended.

The quotient Q as control variable K thus provides a switch for the application of the second filter 40 in the hearing instrument 1 shown in FIG. 3. The gain factors gj in each frequency band can be, for example, continuously monotonous in Q (for example as a result of a direct application of the respective quotient Q as gain factor gj, or as a result of a scaling by means of an exponential function of Q).

In an alternative embodiment, which is not shown, a slowly reacting minimum tracker can also be used to ascertain the minimum value for the quotient Q (in dB) as a reference variable. This reference variable now determines an interval from a desired rejection, that is to say e.g. accordingly an interval of −15 dB for an ascertained minimum of $Q_{min}$=−20 dB and a desired rejection of −35 dB. Consequently, if the value of the quotient (in dB) is negative, even when there are variations around this value, the constant interval value (see above), possibly provided with an additional safety buffer of e.g. a further −5 dB, can then be determined as the constant gain factor gj for the second filter 20.

The gain factors gj are then applied, as the described function of the quotient Q=e/c as the control variable Q, at the second node 42 to the intermediate signal z, provided by the output signal y, which for this purpose is branched off in a separate signal path. Applying the gain factors gj to the intermediate signal z generates the transmission signal t. The reproduction signal w is generated directly as the output signal y. The transmission signal t that is transmitted to the external communication device 4 and reproduced by the loudspeaker 26 there now contains no further voice contributions 30 (or contains such only to a negligible extent; dip in the dotted line) coming from the interlocutor. The interlocutor will no longer hear his voice contributions 30 as "echo" via the loudspeaker 26, since they have now been rejected substantially completely at the second node 42. Only the voice contributions 22 of the wearer of the hearing instrument 1 (which are shown in FIG. 1, but not in FIG. 3) can still be heard by him.

Although the invention has been illustrated and described more thoroughly in detail by way of the preferred exemplary embodiment, the invention is not limited by the examples disclosed and other variations can be derived therefrom by a person skilled in the art without departing from the scope of protection of the invention.

The following is a summary list of reference numerals and the corresponding structure used in the above description of the invention.

LIST OF REFERENCE SIGNS 1 hearing instrument
2 hearing device
4 external communication device
6 first input transducer
8 ambient sound
10 signal processing unit
12 output transducer
14 output sound
16 acoustic feedback path
18 first filter
20 first node
22 voice contributions
24 communication unit
26 loudspeaker
28 external reproduction sound
30 voice contributions
32 microphone
40 second filter
42 second node
c compensation signal
e error signal
gj gain factor
Gr upper limit value
h feedback
K control variable
Q quotient
t transmission signal
T1-T3 first, second, third time window
T3a-T3c first, second, third segment
Tj time axis
W reproduction signal
x1 first input signal
xe external input signal
y output signal
z intermediate signal

The invention claimed is:

1. A method for reducing echo in a hearing instrument, which comprises the steps of:
generating, via an electroacoustic first input transducer of the hearing instrument, a first input signal from ambient sound;
using a communication unit of the hearing instrument to receive an external input signal from an external communication device;
using the first input signal and the external input signal of the hearing instrument to generate an output signal, the output signal being converted into output sound by an electroacoustic output transducer of the hearing instrument;
supplying the output signal to an adaptive first filter, which generates a compensation signal for reducing acoustic feedback from the output transducer to the first input transducer;
using the first input signal and the compensation signal to generate an error signal;
wherein a control variable can be generated based on filter coefficients of the adaptive first filter, a comparison of the error signal with the compensation signal and a comparison of the error signal with the first input signal and generating the control variable based on the filter coefficients, the comparison of the error signal with the compensation signal, or the comparison of the error signal with the first input signal;
taking the control variable as a basis for applying a second filter for rejecting a residual echo or a residual feedback to an intermediate signal derived from the first input signal, and as a result a transmission signal is generated; and
transmitting the transmission signal to the external communication device with the communication unit.

2. The method according to claim 1, wherein the second filter is applied to the intermediate signal according to an arithmetic sign of the control variable or an arithmetic sign of a logarithm of the control variable.

3. The method according to claim 1, which further comprises forming the control variable on a basis of a quotient of amplitudes, absolute values and/or squares of the absolute values of the error signal and the compensation signal.

4. The method according to claim 2, wherein the second filter has a functional dependency on the control variable, and the second filter is applied to the intermediate signal.

5. The method according to claim 2, which further comprises operating the second filter with a previously stipulated parameter value.

6. The method according to claim 1, wherein the second filter applies a gain factor to the intermediate signal in order to attenuate it.

7. The method according to claim 1, wherein the second filter applies a compression to the intermediate signal.

8. The method according to claim 1, which further comprises applying the second filter to a number of frequency bands of the intermediate signal in a at least one of a time or frequency domain.

9. The method according to claim 8, which further comprises applying the second filter to the intermediate signal in a number of frequency bands as a second adaptive filter with more than one filter coefficient in each case.

10. The method according to claim 8, which further comprises applying non-linear processing to the intermediate signal or to a signal derived from the intermediate signal in order to generate a reproduction signal.

11. The method according to claim 8, which further comprises generating the compensation signal on a basis of the output signal or the transmission signal to which the adaptive first filter is applied, and wherein the adaptive first filter is adapted on a basis of the error signal.

12. The method according to claim 1, which further comprises generating the error signal on a basis of a subtraction of the compensation signal from the first input signal.

13. The method according to claim 1, wherein the intermediate signal used is the error signal or the output signal.

14. The method according to claim 4, wherein the functional dependency is a continuously monotonous dependency on the control variable, and the second filter is applied to the intermediate signal according to the arithmetic sign of the control variable or the arithmetic sign of the logarithm of the control variable.

15. The method according to claim 5, wherein the previously stipulated parameter value is independent of an absolute value of the control variable.

16. The method according to claim 10, wherein the non-linear processing is a frequency distortion.

17. A hearing instrument, comprising:
an electroacoustic first input transducer for generating a first input signal from ambient sound;
a communication unit for receiving an external input signal from an external communication device and for transmitting a transmission signal of the hearing instrument to the external communication device;
a signal processor configured to use the first input signal and the external input signal to generate an output signal;
an electroacoustic output transducer converting the output signal into output sound;
an adaptive first filter configured to use the output signal for generating a compensation signal for reducing acoustic feedback from said output transducer to said first input transducer;
said signal processor further configured:
  to use the first input signal and the compensation signal to generate an error signal; and
  to generate a control variable based on any one of three conditions:
  (a) filter coefficients of the adaptive first filter;
  (b) a comparison of the error signal with the compensation signal;
  (c) a comparison of the error signal with the first input signal; and
applying the control variable to a second filter configured to reject a residual echo or a residual feedback in an intermediate signal derived from the input signal, and thereby to generate the transmission signal.

* * * * *